United States Patent [19]
Anderson et al.

[11] Patent Number: 5,867,214
[45] Date of Patent: Feb. 2, 1999

[54] APPARATUS AND METHOD FOR INCREASING A DIGITAL CAMERA IMAGE CAPTURE RATE BY DELAYING IMAGE PROCESSING

[75] Inventors: Eric C. Anderson, San Jose; Mike M. Masukawa, Los Gatos, both of Calif.

[73] Assignee: Apple Computer, Inc., Cupertino, Calif.

[21] Appl. No.: 631,173

[22] Filed: Apr. 11, 1996

[51] Int. Cl.[6] .................................................. H04N 5/225
[52] U.S. Cl. ........................................... 348/231; 348/552
[58] Field of Search ..................................... 348/220, 231, 348/232, 233, 319, 552, 207; 386/4, 33, 45, 52, 111, 112, 125, 126

[56] References Cited

U.S. PATENT DOCUMENTS

| | | | |
|---|---|---|---|
| 4,888,812 | 12/1989 | Dinan et al. ............................ | 382/140 |
| 5,016,107 | 5/1991 | Sasson et al. ............................ | 348/231 |
| 5,164,831 | 11/1992 | Kuchta et al. ........................... | 348/233 |
| 5,220,420 | 6/1993 | Hoarty et al. ............................ | 348/12 |
| 5,475,428 | 12/1995 | Hintz et al. .............................. | 348/263 |
| 5,475,441 | 12/1995 | Parulski et al. ......................... | 348/552 |
| 5,477,264 | 12/1995 | Sarbadhikari et al. .................. | 348/231 |
| 5,493,332 | 2/1996 | Dalton et al. ............................ | 348/207 |
| 5,493,335 | 2/1996 | Parulski et al. ......................... | 348/233 |
| 5,568,192 | 10/1996 | Hannah .................................... | 348/222 |
| 5,581,311 | 12/1996 | Kuroiwa .................................. | 348/231 |
| 5,585,845 | 12/1996 | Kawamura et al. .................... | 348/231 |
| 5,606,365 | 2/1997 | Maurinus et al. ....................... | 348/552 |
| 5,625,412 | 4/1997 | Aciu et al. ............................... | 348/222 |
| 5,631,701 | 5/1997 | Miyake ................................... | 348/222 |
| 5,633,678 | 5/1997 | Parulski et al. ......................... | 348/232 |
| 5,633,976 | 5/1997 | Ogino ..................................... | 348/231 |

OTHER PUBLICATIONS

Martyn Williams, Review–NEC PC–DC401 Digital Still Camera, AppleLink Newbytes, Mar. 15, 1996, pp. 1–3.

*Primary Examiner*—Wendy Garber
*Attorney, Agent, or Firm*—Carr & Ferrell LLP; Gregory J. Koerner

[57] ABSTRACT

An apparatus for increasing a digital camera image capture rate comprises an imaging device for capturing raw image data, a frame buffer for receiving the image data, a first RAM spooler for transferring the raw image data to a RAM disk, a first flash spooler for transferring the raw image data from the RAM disk to a flash memory, an image processor for processing and compressing the raw data, a second RAM spooler for storing the compressed image data into the RAM disk, and a second flash spooler for transferring the compressed image data from the RAM disk to the flash memory.

18 Claims, 12 Drawing Sheets

APPARATUS AND METHOD FOR INCREASING A DIGITAL CAMERA IMAGE CAPTURE RATE BY DELAYING IMAGE PROCESSING

CROSS-REFERENCE TO RELATED APPLICATIONS

This application relates to co-pending U.S. patent application Ser. No. 08/355,031, entitled "A System and Method For Generating a Contrast Overlay as a Focus Assist for an Imaging Device," filed on Dec. 13, 1994, and also relates to co-pending U.S. patent application Ser. No. 08/588,210, entitled "Apparatus and Method for Rotating the Display Orientation of a Captured Image," filed on Jan. 19, 1996.

BACKGROUND OF THE INVENTION

1. Field of the Invention

The present invention relates generally to a method and apparatus for managing digital image data. More particularly, the present invention is an apparatus and method for increasing the image capture rate of a digital camera by delaying image processing and compression.

2. Description of the Background Art

Still-cameras are often required to capture images at rates which vary depending on their selected photographic targets. For example, during a fast-moving sporting event, still-cameras may be required to capture a series of images during a relatively short time period. Thus, an important still-camera performance feature is the capture rate for successive sets of image data.

Another important still-camera performance feature is the number of captured images that can be stored in the camera's finite memory. To maximize the image-carrying capacity of digital still-cameras, it is desirable to compress the images prior to storage. Conventional digital cameras typically perform image processing on the raw image data and then use a high-quality image compression routine (such as JPEG) to compress the image data.

Photographers, however, may want to capture another image before the camera has completed the time-consuming image processing and compression of raw image data. Therefore, the above processing and compression technique can effectively lower the successive image capture rate.

One common approach for minimizing the image processing and compression time is through the use of custom-designed Application Specific Integrated Circuits (ASICs). Typically, up to three relatively expensive ASICs may be required to perform the image processing and compression operations. While such ASIC-based cameras perform the required image processing and compression operations very quickly, their increased cost may render such cameras less attractive to the mainstream consumer market.

To make the digital cameras more affordable, manufacturers have replaced many of the costly ASICs with functionally equivalent software-based routines. The software-based routines may be stored within standard ROM chips and they can also be readily updated by rewriting a portion of the software. Software-based cameras, however, typically require an inordinately long time to perform the image processing and compression operations. This results in slower successive image capture rates and limits the marketability of the software-based digital still-cameras.

Therefore, what is needed is an apparatus and method that enables a relatively low-cost, software-based digital camera to attain higher successive image capture rates.

SUMMARY OF THE INVENTION

The present invention is a method and apparatus for increasing the image capture rate of a digital camera by delaying image processing and compression of the captured image data. In the present invention, an imaging device captures an image in response to an image capture request and responsively produces corresponding raw image data which is temporarily stored into a frame buffer.

A first RAM spooler then typically transfers the raw image data to a RAM disk. A first flash spooler next transfers the raw image data from the RAM disk to a flash memory which preferably is a removable flash disk. An image processor processes and compresses the raw data and may directly store the compressed data to the RAM disk, or alternately, a second RAM spooler may store the compressed image data into the RAM disk. A second flash spooler then transfers the compressed image data from the RAM disk to the flash memory.

The present invention uses a set of priorities designed to maintain the frame buffer in a condition to receive new image data from the imaging device. Therefore, spooling raw data from the frame buffer to the RAM disk has the highest priority, spooling raw data from the RAM disk to the flash memory has the second highest priority, processing and compressing the raw data from the flash memory has the third highest priority, spooling the compressed data into the RAM disk has the fourth highest priority, and spooling the compressed data from the RAM disk to the flash memory has the lowest priority.

DETAILED DESCRIPTION OF THE PREFERRED EMBODIMENT

The present invention comprises an apparatus and method for increasing the successive image capture rate of a digital camera and features a series of priority levels, the highest of which maintains the apparatus in a ready state for capturing multiple sets of raw image data. Recently captured raw images are temporarily diverted to a memory device and the time-intensive software-based image processing and compression operations are postponed until after the apparatus has stopped capturing additional sets of image data or until processor time becomes available. During a time when the apparatus is no longer capturing additional sets of image data, the present invention advantageously performs the image processing and compression operations. As a result, the time delay between successive image captures is greatly reduced.

Figure 1:
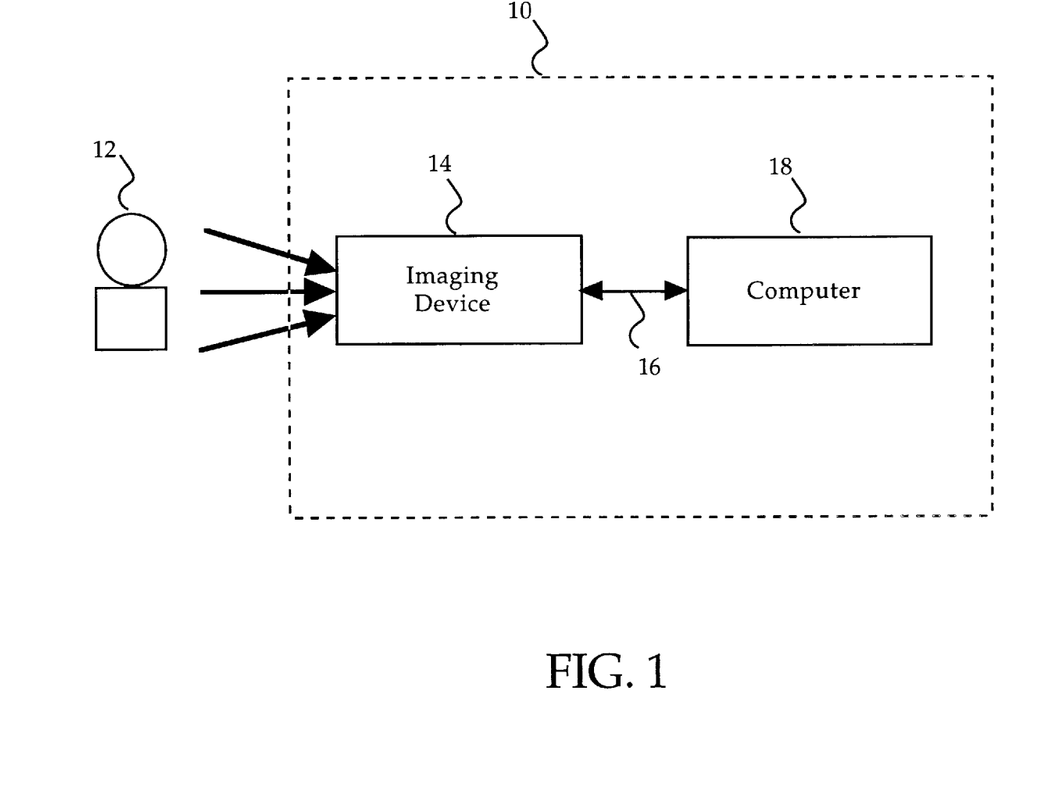
FIG. 1 is a block diagram showing a preferred embodiment of an apparatus for increasing a digital camera image capture rate by delaying image processing.

Referring now to FIG. 1, a block diagram of a preferred embodiment of apparatus 10 for increasing an image capture rate is shown. Apparatus 10 may be used to capture a set of image data representing an object 12. Apparatus 10 preferably comprises an imaging device 14, an external bus 16 and a computer 18. Imaging device 14 is optically coupled to object 12 and electrically coupled via external bus 16 to computer 18. Once a photographer has focused imaging device 14 on object 12 and, using a capture button or some other means, instructed apparatus 10 to capture an image of object 12, computer 18 commands imaging device 14 via external bus 16 to capture raw image data representing object 12. The captured raw image data is transferred over external bus 16 to computer 18 which performs various image processing functions on the image data before storing it in its internal memory. External bus 16 also passes various status and control signals between imaging device 14 and computer 18.

Figure 2:
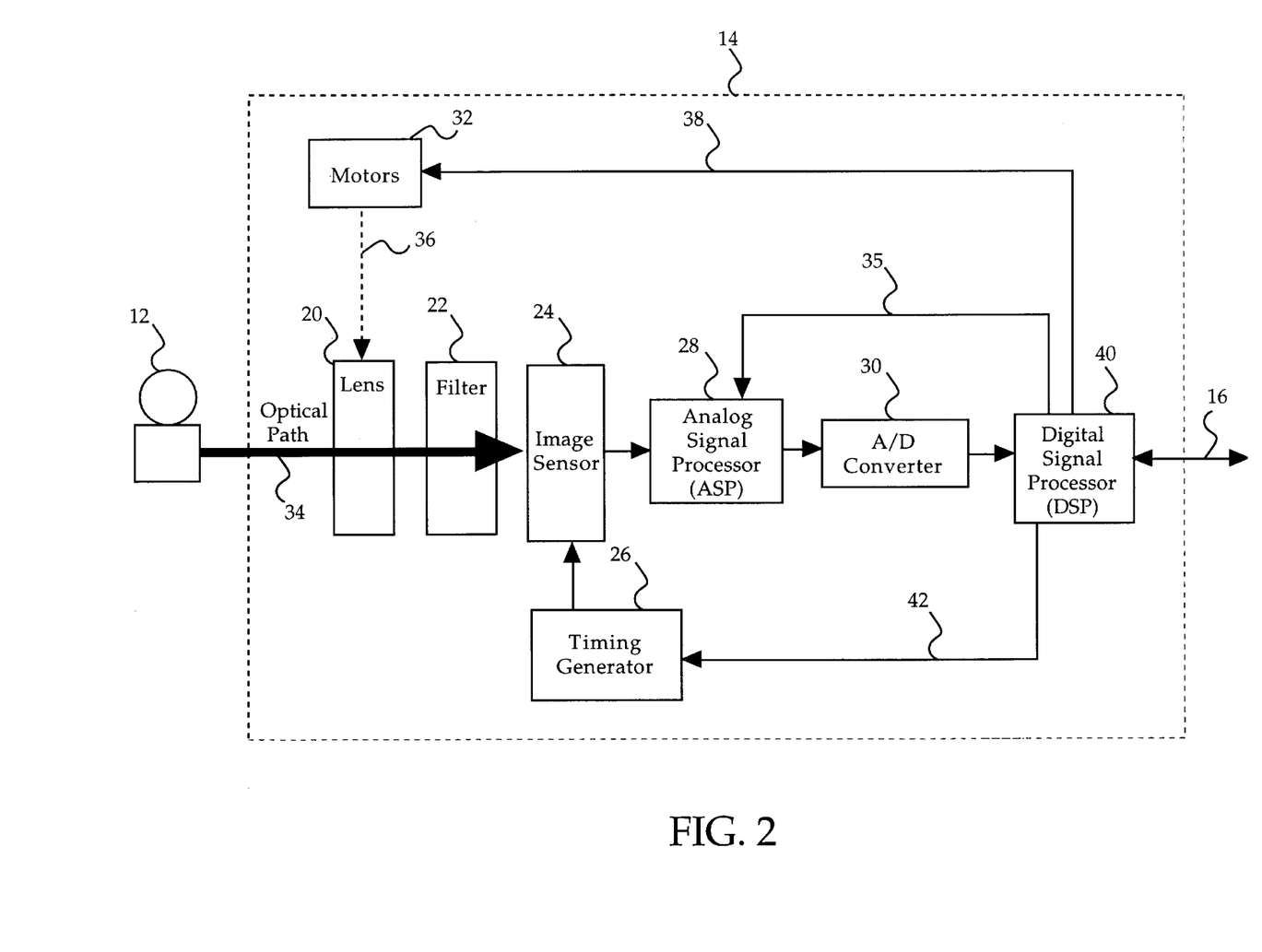
FIG. 2 is a block diagram showing a preferred embodiment of an imaging devices according to the present invention.

Referring now to FIG. 2, a block diagram of a preferred embodiment of imaging device 14 is shown. Imaging device 14 preferably comprises a lens 20 having an iris, a filter 22, an image sensor 24, a timing generator 26, an analog signal processor (ASP) 28, an analog-to-digital (A/D) converter 30, a digital signal processor (DSP) 40, and one or more motors 32.

U.S. patent application Ser. No. 08/355,031, entitled "A System and Method For Generating a Contrast Overlay as a Focus Assist for an Imaging Device," filed on Dec. 13, 1994 is incorporated herein by reference and provides a detailed discussion of the preferred elements of imaging device 14. Briefly, imaging device 14 captures an image of object 12 via reflected light impacting image sensor 24 along optical path 34. Image sensor 24 responsively generates a set of raw image data representing the captured image 12. The raw image data is then routed through ASP 28, A/D converter 30 and DSP 40. DSP 40 has outputs coupled to lines 35, 38 and 42 for controlling ASP 28, motors 32 and timing generator 26. From DSP 40, the raw image data passes over external bus 16 to computer 18.

Figure 3:
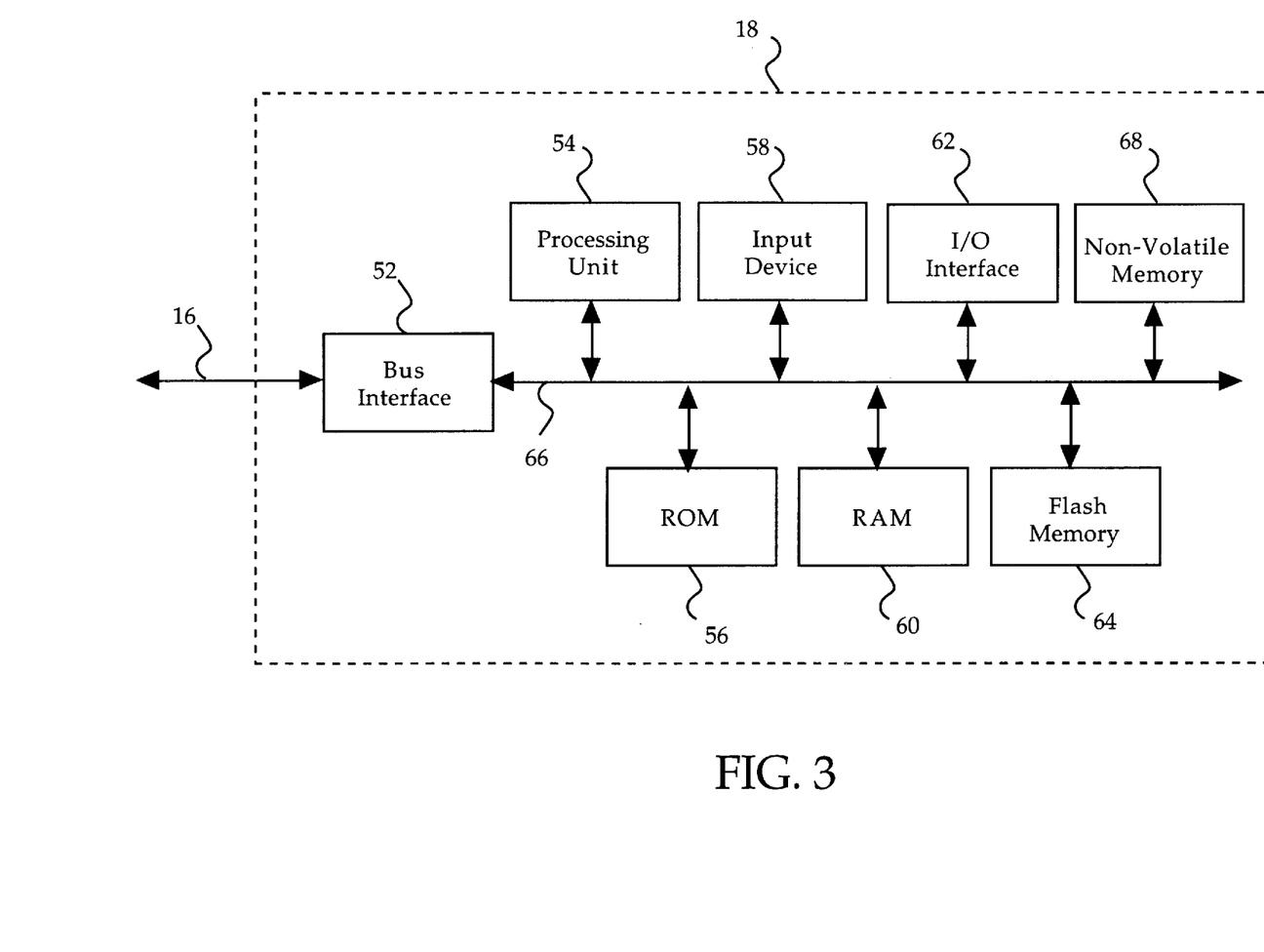
FIG. 3 is a block diagram showing a preferred embodiment of a computer of the present invention.

Referring now to FIG. 3, a block diagram of a preferred embodiment of computer 18 is shown. Computer 18 comprises a bus interface 52, a processing unit 54, a read-only memory (ROM) 56, an input device 58, a random access memory (RAM) 60, an I/O interface 62, a flash memory 64 and a non-volatile memory 68 coupled together via an internal bus 66. In the preferred embodiment, computer 18 is embedded as part of apparatus 10 using a conventional architecture. However, those skilled in the art will recognize that in an alternate embodiment, computer 18 may be a discrete computer system.

Bus interface 52 is preferably a bi-directional first-in, first-out interface for receiving the raw image data and imaging device 14 control signals passed between computer 18 and DSP 40. Interface 52 has data lines coupled to both external bus 16 and internal bus 66. Processing unit 54 executes programming instructions stored in ROM 56 and RAM 60 to perform various operations. ROM 56 stores a set of computer readable program instructions which control how processing unit 54 accesses, transforms and outputs the image data. While ROM 56 is employed as a conventional non-volatile memory device for practicing the present invention, those skilled in the art will recognize that in alternate embodiments ROM 56, could be replaced with a functionally equivalent computer useable medium such as a compact disk and drive, a floppy disk and drive, or a flash memory.

Input device 58 preferably comprises a series of control buttons which generate signals translated by processing unit 54 into an image capture request, an operating mode selection request, and various control signals for imaging device 14. In an alternate embodiment in which computer 18 is a discrete computer system, input device 58 also includes a keyboard and mouse-type controller.

I/O Interface 62 is coupled to internal bus 66 and has an external port connector for coupling computer 18 with a host computer (not shown) for downloading image data stored in RAM 60 and/or flash memory 64. At the user's choice or when apparatus 10 is completely filled with image data, I/O Interface 62 enables the image data to be down-loaded, thus freeing up storage space for future sets of image data. Flash memory 64 serves as an additional image data storage area and is preferably a non-volatile device, readily removable and replaceable by a user. Thus, a user who possesses several flash memories 64 may replace a full flash memory 64 with an empty flash memory 64 to effectively expands the picture taking capacity of apparatus 10. In the preferred embodiment of the present invention, flash memory 64 is a flash disk. Non-volatile memory 68 stores an image counter whose current value becomes an identifier for each new set of image data captured by apparatus 10. The counter is preferably incremented each time a new image is captured. In the preferred embodiment, non-volatile memory 68 is either an EEPROM or a battery-backed SRAM.

Figure 4:
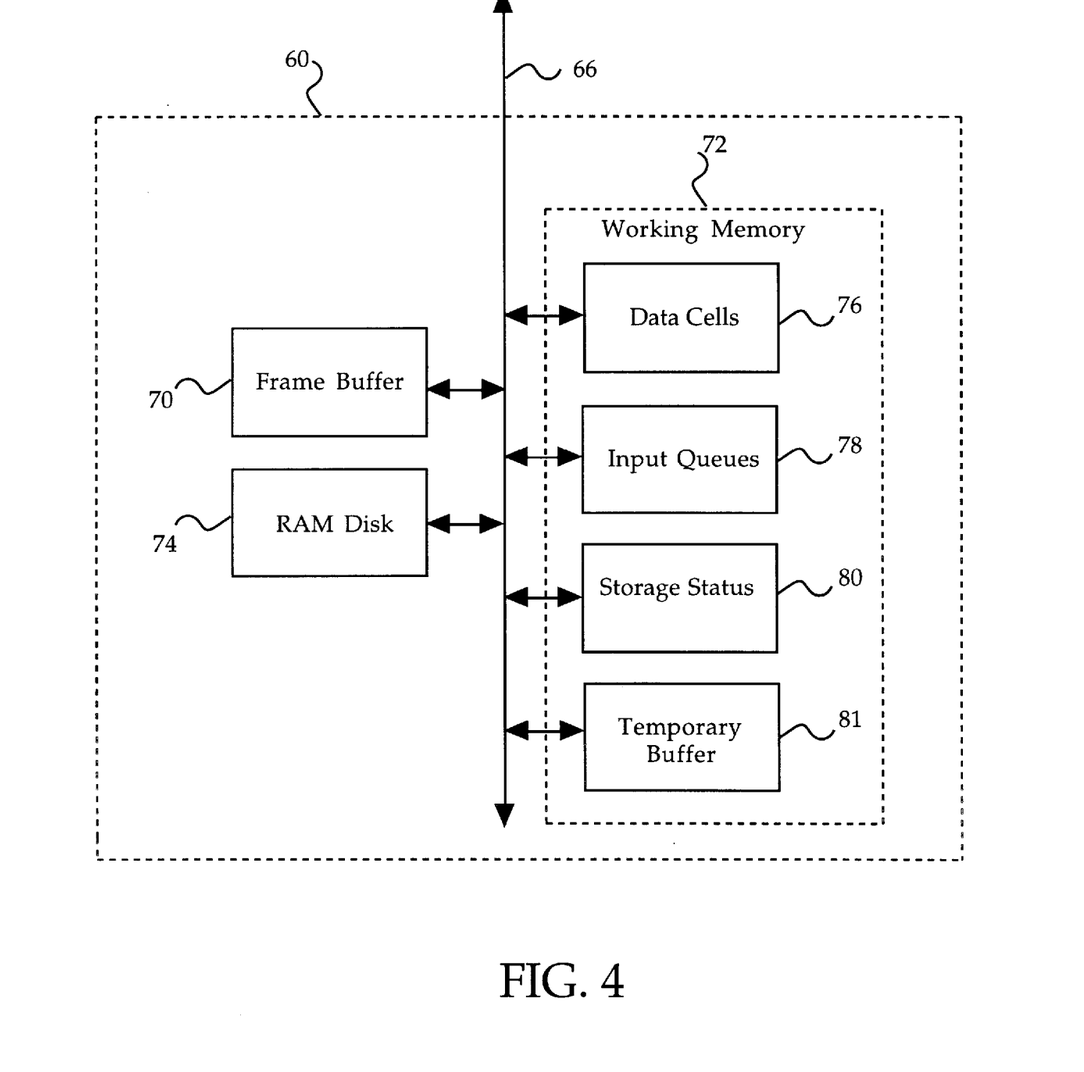
FIG. 4 is a block diagram showing a preferred embodiment of a Random Access Memory (RAM) of the FIG. 3 computer.

Referring now to FIG. 4, a block diagram of a preferred embodiment of RAM 60 is shown. RAM 60 is comprised of a frame buffer 70, a working memory 72 and a RAM disk 74. Frame buffer 70 preferably comprises a dedicated space of contiguous memory suitable for storing the raw image data generated by image sensor 24. The function of frame buffer 70 is to store the most recently captured set of raw image data until computer 18 either stores the raw image data in RAM disk 74 or transfers it to an image processing unit.

RAM disk 74 is a memory area within RAM 60 organized in a "sectored" format similar to that of conventional hard disk drives. The RAM disk 74 function is to store image data. RAM disk 74, in conjunction with flash memory 64, sets the maximum image holding capacity of apparatus 10. Once both flash memory 64 and RAM disk 74 have been filled with compressed image data, the insertion of a new flash memory 64 or down-loading the image data via I/O interface 62 will enable apparatus 10 to continue capturing new images.

Working memory 72 is comprised of data cells 76, input queues 78, storage status 80 and temporary buffer 81, each coupled via internal bus 66. Data cells 76 are data structures and each data cell 76 is uniquely associated with particular captured image data. A data cell is comprised of a plurality of data fields including an image data identifier, a current location and processing requests. The image data identifier is of the preferred form "IMXXXXXX.YYY," where "XXXXXX" is the image number retrieved from non-volatile memory 68 and "YYY" is the image data file type. In the preferred embodiment, the image number "XXXXXX" is not reset, so when images are down-loaded to a host computer, image file identifiers will not conflict with image files previously down-loaded to the host computer. However, in an alternate embodiment the image number "XXXXXX" could be reset each time image data is down-loaded from apparatus 10. Also the "IM" in the image identifier may be replaced with "IO." The image data file type, "YYY," is preferably either CFA, JPG or PCT. CFA refers to a set of raw image data and both JPG and PCT refer to a sets of compressed image data.

The image data's current location data field stores either a "Raw Image Data In Frame Buffer" flag, a "Raw Image Data In RAM Disk" flag, a "Compressed Image Data In RAM Disk" flag, a "Raw Image Data In Flash memory" flag, a "Compressed Image Data In Flash memory" flag, or a "Compressed Image Data In Temporary Buffer" flag. The image data's processing request data field stores either a "Request Deletion Of Image Data" flag and/or a "Stop Processing Of Image Data" flag. Input queues 78 are data structures comprised of a plurality of data cell "pointers" each corresponding to data cells 76. In the preferred embodiment, input queues operate on a first-in/first-out basis.

Storage status 80 is a data structure describing the remaining available memory in both RAM disk 74 and flash memory 64. Storage status 80 contains the following four conditional variables: "RAM Disk Raw File Space," "RAM Disk Compressed File Space," "Flash Memory Raw File Space" and "Flash Memory Compressed File Space." Each of the four conditional variables is set to one of three values: FULL, ALMOST FULL or OK. If the variable is set to "OK," then space is available for that particular file type (i.e., a raw file or a compressed file) on that particular storage resource (i.e., RAM disk 74 or flash memory 64). If the variable is set to "ALMOST FULL" then space is not currently available for that particular file type on that particular storage resource, but there will be space in the future. If the variable is set to "FULL" then, absent an increase in available space on storage resources (due, for example, to downloading data or replacing storage units), no space is available for that particular file type on that particular storage resource, nor will space be available in the future. Temporary buffer 81 of working memory 72 is provided for temporarily storing data and/or program code.

Figure 5:
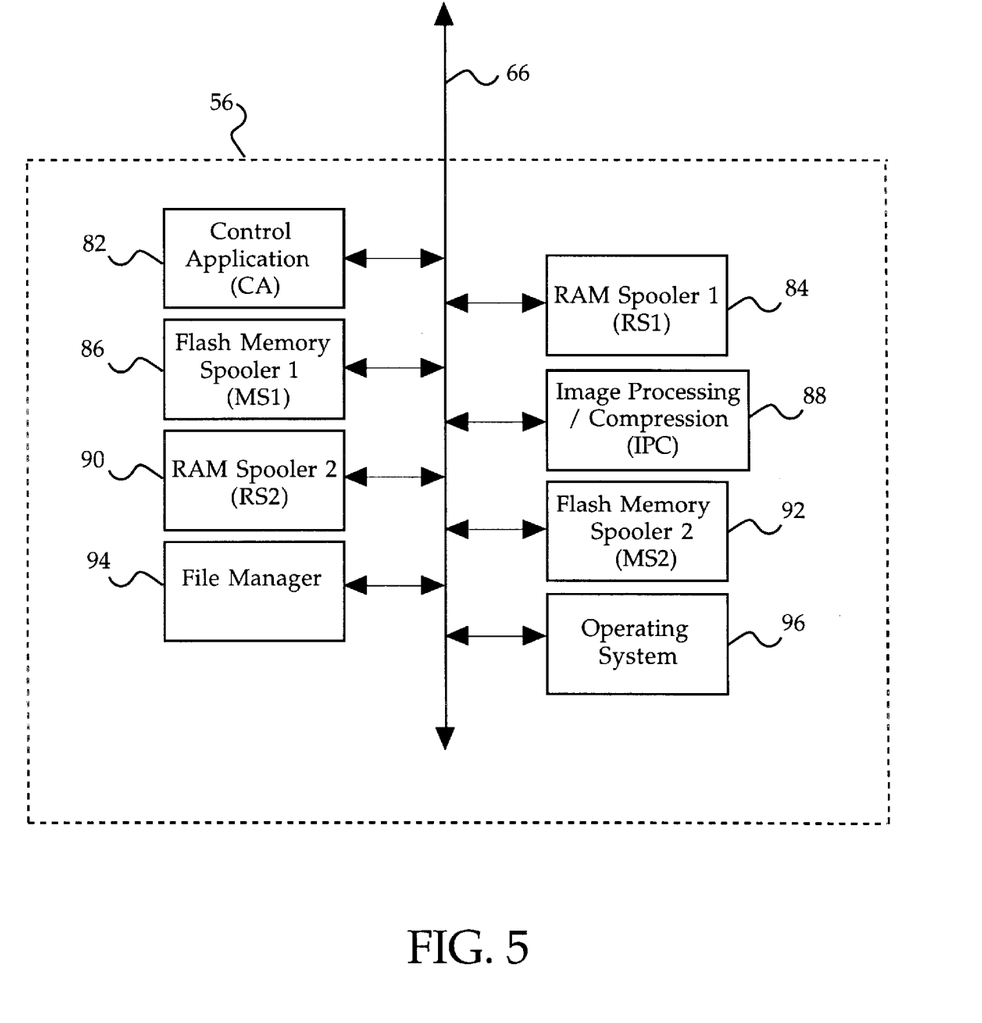
FIG. 5 is a block diagram showing a preferred embodiment of a Read Only Memory (ROM) of the FIG. 3 computer.

Referring now to FIG. 5, a block diagram of a preferred embodiment of ROM 56 is shown. ROM 56 preferably contains code for processes 82 through 96, including a control application (CA) 82, a RAM spooler 1 (RS1) 84, a flash memory spooler 1 (MS1) 86, image processing/compression (IPC) 88, a RAM spooler 2 (RS2) 90, a flash memory spooler 2 (MS2) 92, a file manager 94, and an operating system 96, each coupled via internal bus 66. In alternate embodiments, the FIG. 5 processes 82 through 96 may be stored in various computer memory types other than ROM 56.

A "spooler" is herein defined as a routine for transferring data from one process or device to a second process or device. RAM spooler 1 (84) transfers raw image data into RAM disk 74, and flash memory spooler 1 (86) transfers raw image data into flash memory 64. RAM spooler 2 (90) transfers compressed image data into RAM disk 74 or to I/O interface 62, and flash memory spooler 2 (92) transfers compressed image data into flash memory 64.

Control application 82 preferably comprises program instructions for controlling the operation of apparatus 10 which are executed using processing unit 54. For example, control application 82 creates and maintains data cells 76. Image processing/compression 88 compresses the raw image data to maximize the image-carrying capacity of apparatus 10, and also processes the raw image data to permit readily displaying the captured image data on a host computer. In the preferred embodiment, processes 82 through 96 are comprised of a series of software steps implemented on top of a multithreaded operating system and may therefore run in parallel operation.

Figure 6:
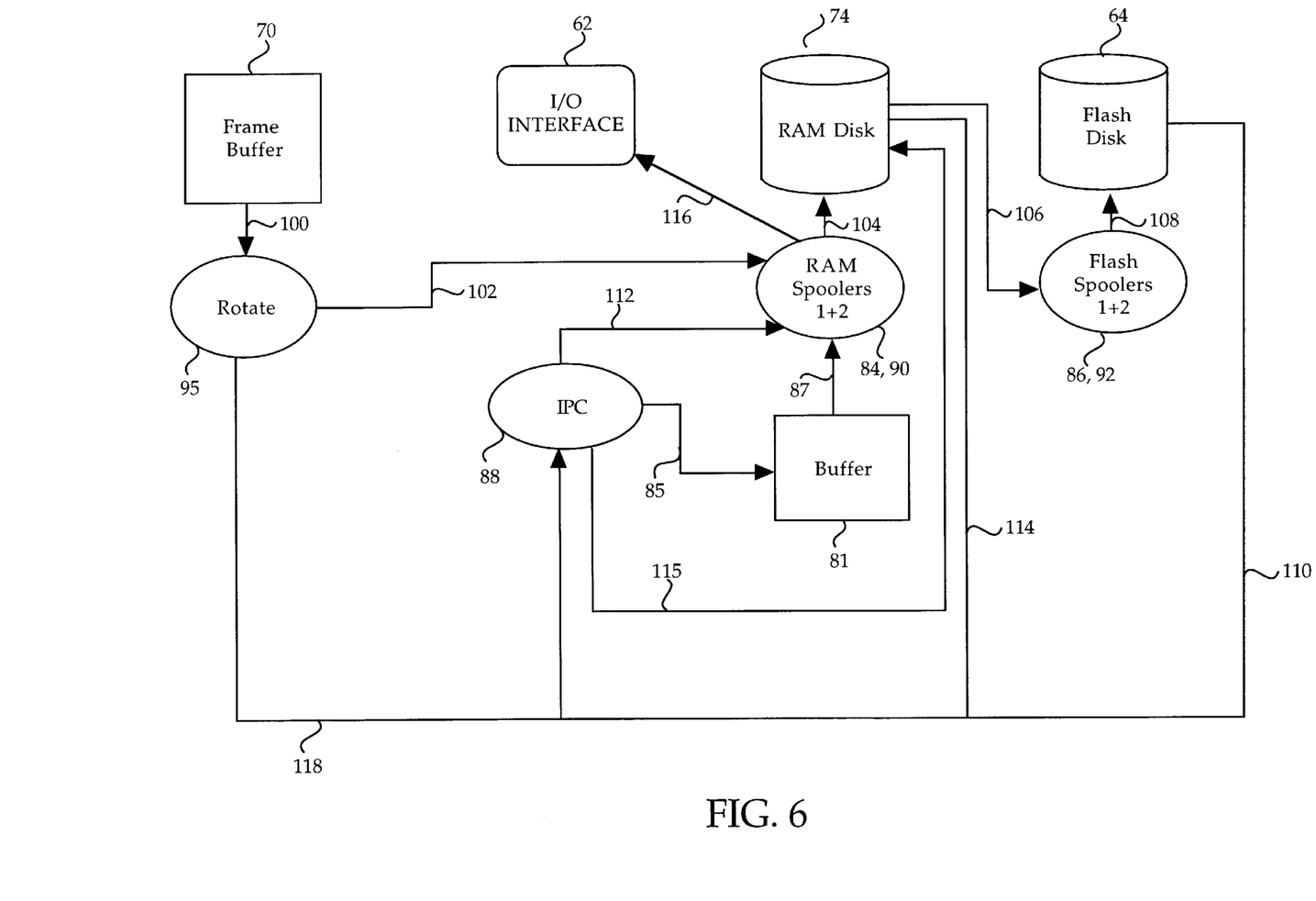
FIG. 6 is a block diagram showing a preferred embodiment of an apparatus for increasing a camera image capture rate according to the present invention.

FIG. 6 is a block diagram showing a preferred embodiment of apparatus 10 for increasing a camera image capture rate. In FIG. 6, frame buffer 70 receives and stores raw image data previously captured by imaging device 14. Frame buffer 70 then provides the raw image data via line 100 to rotate process 95 which is described in detail in co-pending U.S. patent application Ser. No. 08/588,210, entitled "Apparatus and Method for Rotating the Display Orientation of a Captured Image," filed on Jan. 19, 1996, which is hereby incorporated by reference.

Process 95 rotates the captured image if necessary and then transfers control of the raw image data to RAM spooler 1 (84) using line 102. Alternately, if RAM disk 74 is full, rotate process 95 may transfer control of the raw image data directly to image processing/compression (IPC) 88 using line 118. If RAM spooler 1 (84) receives control of the raw image data, it then stores the raw image data into RAM disk 74 using line 104.

Flash spooler 1 (86) may then access the raw image data from RAM disk 74 via line 106 and store it into flash memory 64 using line 108. Alternately, if flash memory 64 is full, RAM disk 74 may provide the raw image data directly to IPC 88 using line 114. If flash spooler 1 (86) stores the raw image data into flash memory 64, then IPC 88 typically accesses the stored raw image data using line 110 and processes the raw data to responsively obtain compressed image data.

IPC 88 may bypass RAM spooler 2 (90) and store the compressed data directly to RAM disk 74 via line 115, or alternately, if RAM disk 74 is temporarily full, IPC 88 may write the compressed data to temporary RAM buffer 81 via line 85. RAM spooler 2 (90) may then access the compressed image data via line 87 and write the accessed data into RAM disk 74 via line 104. RAM spooler 2 (90) may also download the compressed image data to I/O interface 62 using line 116. Once the compressed data is in RAM disk 74, flash spooler 2 (92) then accesses the data via line 106 and writes the compressed data into flash memory 64.

The present invention may thus process and store a sequence of captured images received from imaging device 14. Although the above example traces the typical data path for a single captured image, the present invention may readily operate on a plurality of captured images progressing through various stages of apparatus 10. Therefore, multiple sets of image data may exist simultaneously within computer 18. The current processing stage for a specific set of image data is preferably indicated by flags located in the image data's unique data cell 76.

Figure 7:
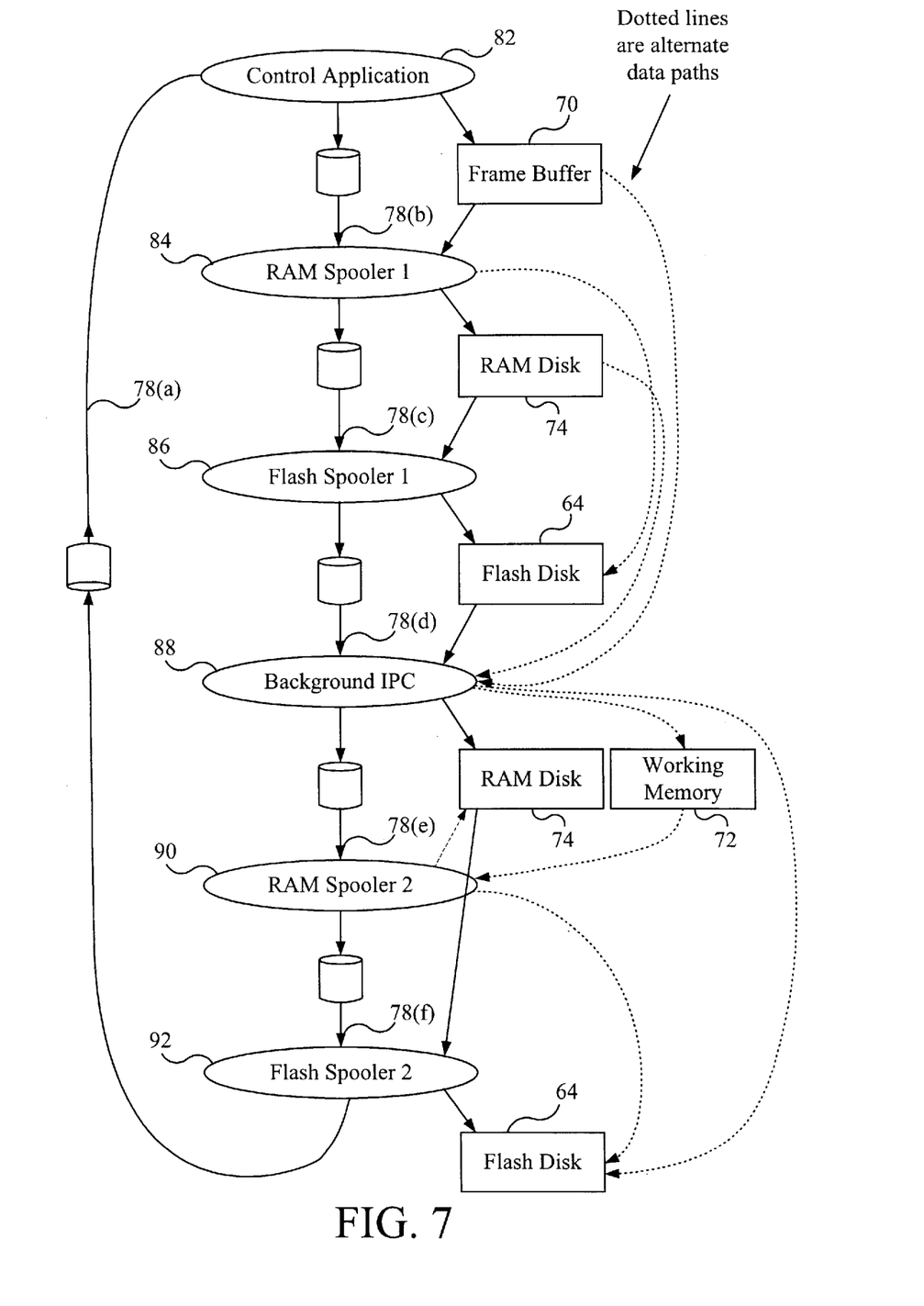
FIG. 7 is a block diagram showing priority levels of preferred processes and corresponding image data paths.

FIG. 7 is a block diagram showing priority levels for processes 84 through 92 of the preferred embodiment with corresponding image data routing paths. Background processes 84 through 92 are preferably allotted processing unit 54 time depending on their priority level. This priority level is related to the goal of rapidly emptying frame buffer 70 to enable rapid capture of successive sets of image data.

Control application 82 transfers raw image data from imaging device 14 to frame buffer 70 and may supersede any of background processes 84 through 92. The background process with the highest priority is RAM spooler1 (84) which moves raw image data out of frame buffer 70 to RAM disk 74. The second highest priority is flash memory spooler 1 (86) which moves raw image data out of RAM disk 74 to flash memory 64. The third highest priority is Image Processing/Compression 88 which accesses raw image data and responsively processes and compresses the image data before storing it as compressed image data into RAM disk 74, or if RAM disk 74 is full, into temporary RAM buffer 81 of working memory 72. The fourth highest priority is RAM spooler 2 (90) which, if necessary, may move compressed image data out of working memory 72 into RAM disk 74. The lowest priority is flash memory spooler 2 (92) which moves the compressed image data out of RAM disk 74 into flash memory 64. Those skilled in the art will recognize that either a greater or a lesser number of priority levels than the preferred five may be used in the present invention. Also, alternate embodiments may establish different criteria for routing the captured image data, depending upon memory resources available and/or the maximum image capture rate desired. File manager process 94 and operating system process 96 are not assigned specific priority levels since they either operate in the background or under interrupt conditions.

Processes 82 through 92 preferably each has a respective input queue 78(a) through 78(f) which operates on a first-in/first-out basis. If one of processes 82 through 92 has a data cell 76 pointer in its input queue, then only that process can access and perform operations on the image data associated with that particular data cell 76. The data cell pointers are passed between processes 82 through 92 in a specific order until the original raw image data has been fully processed, compressed and stored in a memory resource.

The priority level scheme introduced above may "block" one or more processes 84 through 92 even though a data cell 76 pointer is in its input queue 78. For example, since moving raw image data out of frame buffer 70 has the highest priority, if a user repeatedly captures images in rapid succession, RAM spooler 1 (84) will continue to operate until RAM disk 74 becomes filled with raw image data. While RAM spooler 1 (84) is operating, all of the other lower priority processes 86 through 92 will be "blocked" (i.e., idled), even though some of the lower priority processes 86 through 92 may still have data cell 76 pointers in their input queues 78. This blocking of lower priority processes applies to all priority levels. For example, operation of flash memory spooler1 (86) will block image processing/compression 88, RAM spooler 2 (90) and flash memory spooler 2 (92), and operation of image processing/compression 88 will block RAM spooler 2 (90) and flash memory spooler 2 (92), and so on, until the image data has been fully processed, compressed and stored in memory. Furthermore, if a lower priority ROM process is currently operating and a higher priority ROM process requires processing unit 54, then the lower priority ROM process is immediately blocked until the higher priority ROM process has completed its operations.

Figure 8:
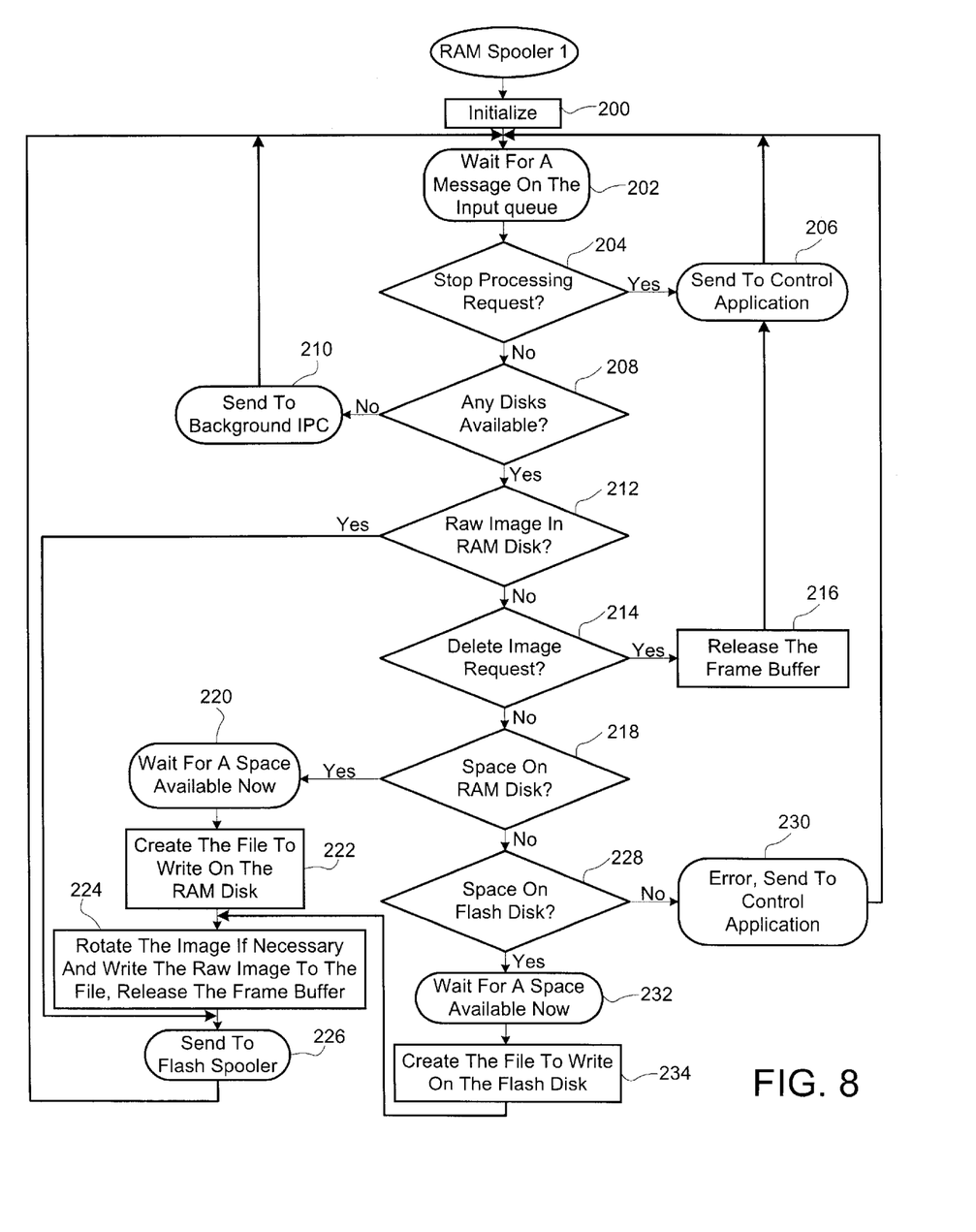
FIG. 8 is a flowchart of preferred method steps for implementing RAM Spooler 1 of the present invention.

FIG. 8 is a flowchart of preferred method steps for implementing RAM spooler 1 (84) according to the present invention. In step 200, processing unit 54 initializes RAM spooler 1 (84). RAM spooler 1 (84) waits 202 for a message or pointer on its input queue 78. Once a message is received, RAM spooler 1 (84), determines 204 whether a "stop processing" request is present by checking a corresponding request bit in data cell 76. If the "stop processing" request is present, step 206 returns data cell 76 to control application 82 and returns the FIG. 8 process back to step 202. If the request is not present, step 208 determines whether RAM disk 74 or flash memory 64 are available. If not available, step 210 sends the raw image data directly to IPC 88 and returns the FIG. 8 process back to step 202.

If RAM disk 74 or flash memory 64 are available, step 212 determines whether the raw image data is stored in RAM disk 74. If the data is already stored in RAM disk 74, step 226 sends the raw image data to flash spooler 1 (86) and returns the FIG. 8 process to step 202. If the data is not stored in RAM disk 74, step 214 determines whether a "delete image" request is present by checking a corresponding request bit in data cell 76. If the request is present, step 216 releases frame buffer 70 to accept incoming raw image data from imaging device 14. Step 206 then returns data cell 76 to control application 82 and the FIG. 8 process returns to step 202. If the "delete image" request is not present, step 218 determines whether there is (or will be) space on RAM disk 74 by checking storage status 80, as described above in conjunction with FIG. 4. If there is (or will be) space, step 220 waits for a "space available now" signal before step 222 creates the file to write on RAM disk 74. If step 218 determines that RAM disk 74 has no space, then step 228 determines whether flash memory 64 has (or will have) space by checking storage status 80. If flash memory 64 has no space, an error condition exists. Step 230 therefore returns data cell 76 to control application 82 and returns the FIG. 8 process to step 202. If flash memory 64 has (or will have) space, step 232 waits for a "space available now" signal before step 234 creates the file to write on flash memory 64.

In step 224, the image is rotated if necessary, and RAM spooler 1 (84) writes the raw image data to the created file and releases frame buffer 70 to accept new incoming raw image data from imaging device 14. Step 226 transfers control to flash spooler 1 (86) and returns the FIG. 8 process to step 202 to wait for another message on its input queue 78.

Figure 9:
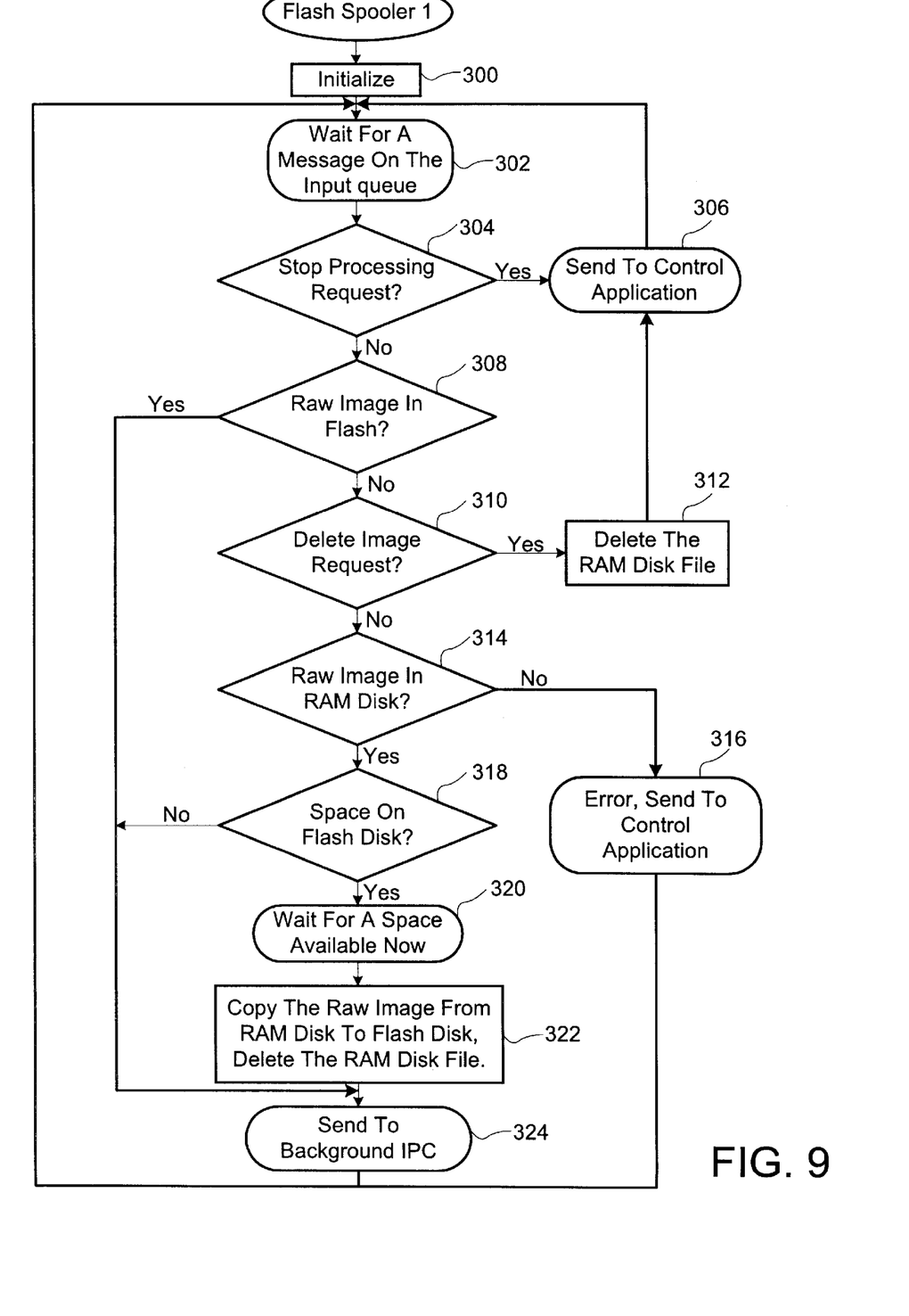
FIG. 9 is a flowchart of preferred method steps for implementing the Flash Spooler 1 of the present invention.

FIG. 9 is a flowchart of preferred method steps for implementing flash spooler 1 (86) according to the present invention. In step 300, processing unit 54 initializes flash spooler 1 (86). In step 302, flash spooler 1 (86) waits for a message on its input queue 78 before advancing to step 304. Flash spooler 1 (86), in step 304, determines whether a "stop processing" request is present. If the request is present, step 306 returns data cell 76 to control application 82 and returns the FIG. 9 process back to step 302.

If the request is not present, step 308 determines whether the raw image data is stored in flash memory 64. If the data is already stored in flash memory 64, step 324 sends the raw image data to IPC 88 and returns the FIG. 9 process to step 302. If the data is not stored in flash memory 64, step 310 determines whether a "delete image" request is present. If the request is present, step 312 deletes the file in RAM disk 74. Step 306 then sends data cell 76 to control application 82 and the FIG. 9 process returns to step 302. If the "delete image" request is not present, step 314 determines whether the raw image data is stored in RAM disk 74. If the data is not stored in RAM disk 74, step 316 signals an error, returns data cell 76 to control application 82 and returns the FIG. 9 process back to step 302.

If the raw image data is stored in RAM disk 74, step 318 determines whether flash memory 64 has (or will have) space. If flash memory 64 has no space, step 324 sends data cell 76 to image processing/compression and then the FIG.

9 process returns to step 302. If flash memory 64 has (or will have) space, step 320 waits for a "space available now" signal before flash spooler 1 (86), in step 322, copies the raw image data from RAM disk 74 to flash memory 64 and then deletes the file on RAM disk 74. Step 324 transfers control to IPC 88 and returns the FIG. 9 process to step 302 to wait for another message on its input queue 78.

Figure 10:
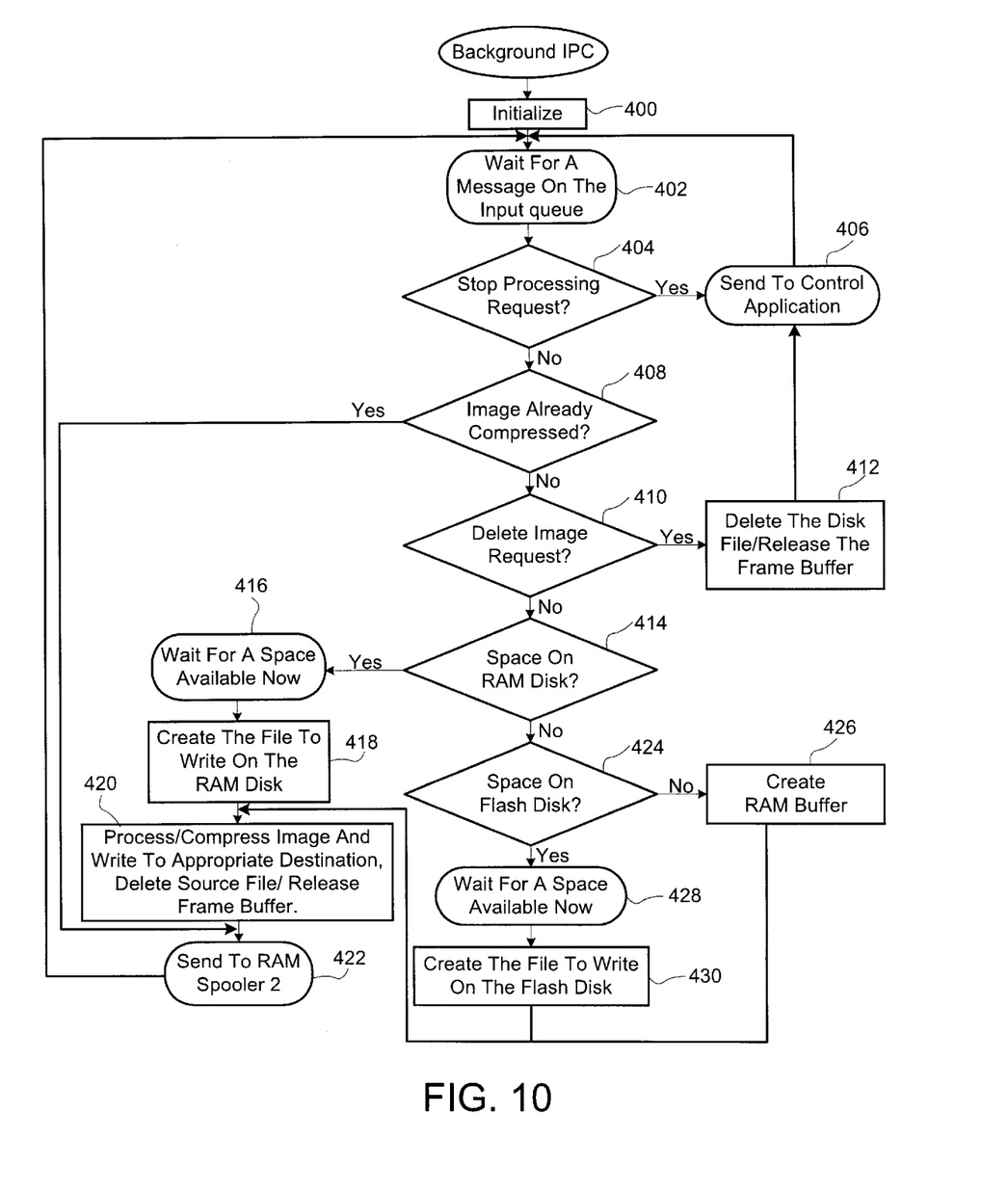
FIG. 10 is a flowchart of preferred method steps for implementing the Image Processing/Compression of the present invention.

FIG. 10 is a flowchart of preferred method steps for implementing the image processing/compression 88 of the present invention. In step 400, processing unit 54 initializes IPC 88. In step 402, IPC 88 waits for a message on its input queue 78 before advancing to step 404. IPC 88, in step 404, determines whether a "stop processing" request is present. If the request is present, step 406 returns data cell 76 to control application 82 and returns the FIG. 10 process back to step 402. If the request is not present, step 408 determines whether the image data is already compressed. If already compressed, step 422 sends the compressed image data to RAM spooler 2 (90) and returns the FIG. 10 process to step 402.

If the data is not compressed, step 410 determines whether a "delete image" request is present. If the request is present, step 412 deletes the disk file or releases frame buffer 70 to accept incoming raw image data from imaging device 14. Step 406 then sends data cell 76 to control application 82 and returns the FIG. 10 process to step 402. If the "delete image" request is not present, step 414 determines whether there is (or will be) space on RAM disk 74. If there is space, step 416 waits for a "space available now" signal before step 418 creates the file to write on RAM disk 74. If step 414 determines that RAM disk 74 has no space, then step 424 determines whether flash memory 64 has (or will have) space. If flash memory 64 has no space, step 426 creates a RAM 60 buffer to hold the image data. If flash memory 64 has (or will have) space, step 428 waits for a "space available now" signal before step 430 creates the file to write on flash memory 64.

In step 420, IPC 88 processes and compresses the raw image data and writes it to the appropriate destination (RAM disk 74, flash memory 64 or the RAM 60 buffer created in step 426) and then deletes the source file or releases frame buffer 70 to accept new incoming raw image data from imaging device 14. Step 422 transfers control to RAM spooler 2 (90) and returns the FIG. 10 process to step 402 to wait for another message on its input queue 78.

Figure 11:
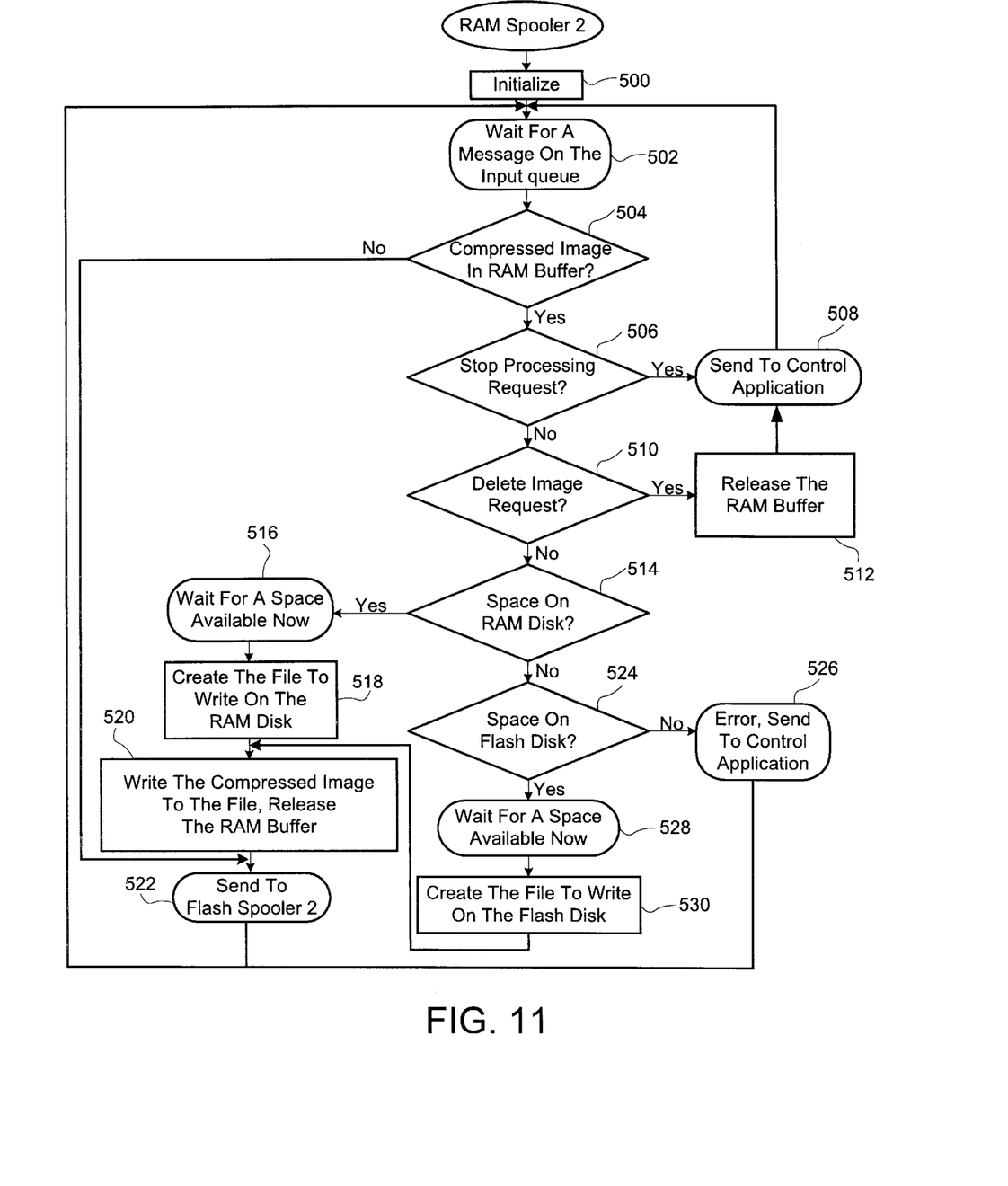
FIG. 11 is a flowchart of preferred method steps for implementing the RAM Spooler 2 of the present invention.

FIG. 11 is a flowchart of preferred method steps for implementing RAM Spooler 2 (90) of the present invention. In step 500, processing unit 54 initializes RAM spooler 2 (90). In step 502, RAM spooler 2 (90) waits for a message on its input queue 78 before advancing to step 504. RAM spooler 2 (90), in step 504, determines whether the compressed image data is in the RAM 60 buffer created in step 426 (FIG. 10). If not, step 522 sends the compressed data to flash spooler 2 (92) and returns the FIG. 11 process to step 502. If so, step 506 determines whether a "stop processing" request is present. If the request is present, step 508 returns data cell 76 to control application 82 and returns the FIG. 11 process back to step 502.

If the "stop processing" request is not present, step 510 determines whether a "delete image" request is present. If the request is present, step 512 releases the RAM 60 buffer. If the "delete image" request is not present, step 514 determines whether there is (or will be) space on RAM disk 74. If there is (or will be) space, step 516 waits for a "space available now" signal before step 518 creates the file to write on RAM disk 74. If step 514 determines that RAM disk 74 has no space, then step 524 determines whether flash memory 64 has (or will have) space. If flash memory 64 has no space, step 526 signals an error, returns data cell 76 to control application 82 and returns the FIG. 11 process to step 502. If flash memory 64 has (or will have) space, step 528 waits for a "space available now" signal before step 530 creates the file to write on flash memory 64.

In step 520, RAM spooler 2 (90) writes the compressed image data to the created file and releases the RAM 60 buffer. Step 522 transfers control to flash spooler 2 (92) and returns the FIG. 11 process to step 502 to wait for another message on its input queue 78.

Figure 12:
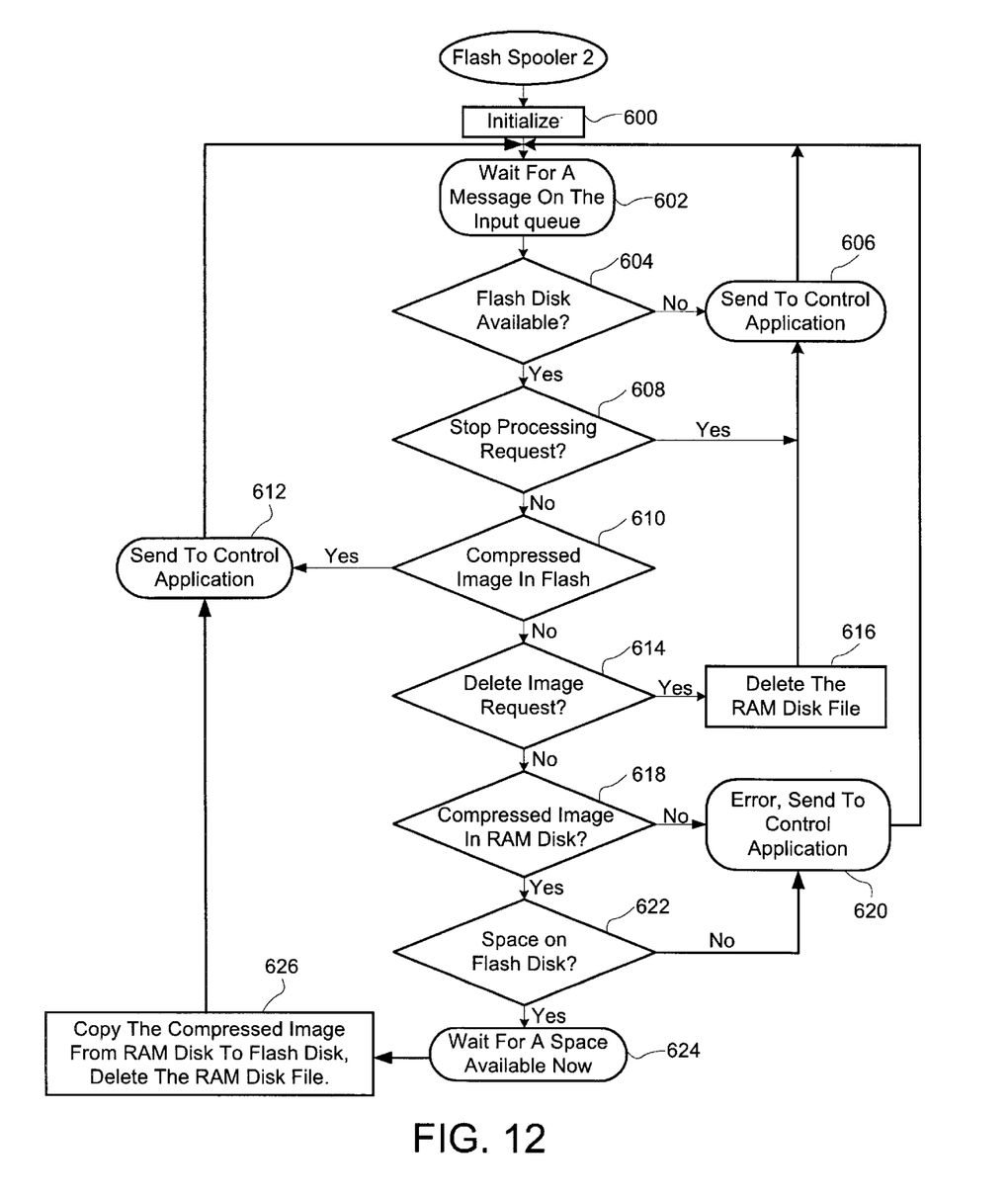
FIG. 12 is a flowchart of preferred method steps for implementing the Flash Spooler 2 of the present invention.

FIG. 12 is a flowchart of preferred method steps for implementing the flash spooler 2 (92) of the present invention. In step 600, processing unit 54 initializes flash spooler 2 (92). In step 602, flash spooler 2 (90) waits for a message on its input queue 78 before advancing to step 604. Flash spooler 2 (92), in step 604, determines whether flash memory 64 is available. If not available, step 606 returns data cell 76 to control application 82 and returns the FIG. 12 process to step 602. If flash memory 64 is available, step 608 determines whether a "stop processing" request is present. If the request is present, step 606 returns data cell 76 to control application 82 and returns the FIG. 12 process back to step 602.

If the request is not present, step 610 determines whether the compressed image data is stored in flash memory 64. If the data is stored in flash memory 64, step 612 returns data cell 76 to control application 82 and returns the FIG. 12 process to step 602. If the compressed data is not stored in flash memory 64, step 614 determines whether a "delete image" request is present. If the request is present, step 616 deletes the file in RAM disk 74. Step 606 then returns data cell 76 to control application 82 and returns the FIG. 12 process to step 602. If the "delete image" request is not present, step 618 determines whether the compressed image data is stored in RAM disk 74. If the compressed data is not stored in RAM disk 74, step 620 signals an error, returns data cell 76 to control application 82 and returns the FIG. 12 process to step 602. If the compressed image data is stored in RAM disk 74, step 622 determines whether flash memory 64 has (or will have) space. If flash memory 64 has no space, step 620 signals an error, returns data cell 76 to control application 82 and returns the FIG. 12 process to step 602. If flash memory 64 has (or will have) space, step 624 waits for a "space available now" signal before flash spooler 2 (92), in step 626, copies the compressed image data from RAM disk 74 to flash memory 64 and then deletes the file on RAM disk 74. Step 612 then returns data cell 76 to control application 82 and returns the FIG. 12 process to step 602 to wait for another message on its input queue 78.

The present invention has been described above with reference to certain preferred embodiments, however, those skilled in the art will recognize that various modifications may be provided. Furthermore, while the present invention has been discussed above as applied to digital cameras, those skilled in the art will also recognize that the current apparatus and method may also be applied to other devices such as optical scanners and fax machines. These and other variations upon and modifications to the preferred embodiment are provided for by the present invention which is limited only by the following claims.

What is claimed is:

1. A method for increasing a digital camera image capture rate, comprising the steps of:

capturing an image upon detecting an image capture request;

storing the image in a memory device;

repeating the capturing and storing steps if another image capture request is detected;

performing image processing and compression on the image;

halting the image processing/compression step and returning to the capturing step if another image capture request is detected; and resuming the image processing/compression step after the capturing, storing and repeating steps have been performed.

2. The method of claim 1 further comprising the steps of:

deleting the image before the storing step if an image deletion request is detected; and deleting the image before the image processing/compression step if the image deletion request is detected.

3. The method of claim 1 wherein:

the image is a raw image;

the capturing step further comprises the step of placing the raw image in a frame buffer;

the memory device is comprised of a first memory device and a second memory device, and the storing step further comprises the steps of:
  (a) skipping to step (e), if the first memory device does not have room for another raw image;
  (b) copying the raw image from the frame buffer to the first memory device;
  (c) deleting the raw image from the frame buffer;
  (d) returning to said capturing step if another raw image capture request is detected;
  (e) skipping to the image processing and compression step if the second memory device does not have room for another raw image;
  (f) copying the raw image from the first memory device to the second memory device;
  (g) halting step (f) and returning to step (a) if the image capture request is detected;
  (h) deleting the raw image from the first memory device; and
  (i) returning to step (b) if another raw image can be moved from the frame buffer to the first memory device.

4. The method of claim 3, wherein the image processing and compression step further comprises the steps of:

processing the raw image from the frame buffer if the raw image is located in the frame buffer;

processing the raw image from the first memory device if the raw image is located in the first memory device;

processing the raw image from the second memory device if the raw image is located in the second memory device;

halting the image processing and compression step and returning to said capturing step if the image capture request is detected;

halting the image processing and compression step and returning to step (b) if at least one more raw image can be copied from the frame buffer to the first memory device;

halting the image processing and compression step and returning to step (f) if at least one more raw image can be copied from the first memory device to the second memory device; and storing a compressed image in a memory device.

5. The method of claim 4 wherein the first memory device is a RAM disk and the second memory device is a removable flash memory.

6. An apparatus for increasing a digital camera image capture rate, comprising:

means for capturing an image upon detecting an image capture request;

means for storing the image in a memory device;

means for repeating the capturing and storing if another image capture request is detected;

means for performing image processing and compression on the image;

means for halting the image processing and compression means and returning to the capturing means if another image capture request is detected; and means for resuming the image processing and compression means after the capturing, storing and repeating means have been performed.

7. The apparatus of claim 6 further comprising:

means for deleting the image before the storing means if an image deletion request is detected; and means for deleting the image before the image processing and compression means if the image deletion request is detected.

8. The apparatus of claim 6 wherein:

the image is a raw image;

the means for capturing further comprises means for placing the raw image in a frame buffer;

the memory device is comprised of a first memory device and a second memory device, and the storing means further comprises:
  (a) means for skipping to means (e) if the first memory device does not have room for another raw image;
  (b) means for copying the raw image from the frame buffer to the first memory device;
  (c) means for deleting the raw image from the frame buffer;
  (d) means for returning to means for capturing if another raw image capture request is detected;
  (e) means for skipping to the image processing and compression means if the second memory device does not have room for another raw image;
  (f) means for copying the raw image from the first memory device to the second memory device;
  (g) means for halting means (f) and returning to means (a) if the image capture request is detected;
  (h) means for deleting the raw image from the first memory device; and
  (i) means for returning to means (b) if another raw image can be moved from the frame buffer to the first memory device.

9. The apparatus of claim 8, wherein the image processing and compression means further comprises:

means for processing the raw image from the frame buffer if the raw image is located in the frame buffer;

means for processing the raw image from the first memory device if the raw image is located in the first memory device;

means for processing the raw image from the second memory device if the raw image is located in the second memory device;

means for halting the image processing and compression means and returning to the means for capturing if the image capture request is detected;

means for halting the image processing and compression means and returning to means (b) if at least one more raw image can be copied from the frame buffer to the first memory device;

means for halting the image processing and compression means and returning to means (f) if at least one more raw image can be copied from the first memory device to the second memory device; and means for storing a compressed image in a memory device.

10. The apparatus of claim 9 wherein the first memory device is a RAM disk and the second memory device is a removable flash memory.

11. A computer readable medium comprising program instructions for:

capturing an image upon detecting an image capture request;

storing the image in a memory device;

repeating the capturing and storing steps if another image capture request is detected;

performing image processing and compression on the image;

halting the image processing and compression step and returning to the capturing step if another image capture request is detected; and resuming the image processing and compression step after the capturing, storing and repeating steps have been performed.

12. The medium of claim 11 further comprising instructions for:

deleting the image before the storing step if an image deletion request is detected; and deleting the image before the image processing and compression step if the image deletion request is detected.

13. The medium of claim 11 wherein:

the image is a raw image;

the capturing step further comprises the step of placing the raw image in a frame buffer;

the memory device is comprised of a first memory device and a second memory device, and the storing step further comprises the steps of:

(a) skipping to step (e) if the first memory device does not have room for another raw image;

(b) copying the raw image from the frame buffer to the first memory device;

(c) deleting the raw image from the frame buffer;

(d) returning to said capturing step if another raw image capture request is detected;

(e) skipping to the image processing and compression step if the second memory device does not have room for another raw image;

(f) copying the raw image from the first memory device to the second memory device;

(g) halting step (f) and returning to said capturing step if the image capture request is detected;

(h) deleting the raw image from the first memory device; and (i) returning to step (b) if another raw image can be moved from the frame buffer to the first memory device.

14. The medium of claim 13 wherein the image processing and compression step further comprises the steps of:

processing the raw image from the frame buffer if the raw image is located in the frame buffer;

processing the raw image from the first memory device if the raw image is located in the first memory device;

processing the raw image from the second memory device if the raw image is located in the second memory device;

halting the image processing and compression step and returning to said capturing step if the image capture request is detected;

halting the image processing and compression step and returning to step (b) if at least one more raw image can be copied from the frame buffer to the first memory device;

halting the image processing and compression step and returning to step (f) if at least one more raw image can be copied from the first memory device to the second memory device; and storing a compressed image in a memory device.

15. The medium of claim 14 wherein the first memory device is a RAM disk and the second memory device is a removable flash memory.

16. An apparatus for increasing a digital camera capture rate, comprising:

an imaging device for generating raw image data responsive to an image capture request;

a memory buffer for initially storing the raw image data;

first routines for conveying the initially stored raw image data away from the frame buffer to a second memory location to provide space for storing additional, subsequently captured images, wherein the raw image data is stored in uncompressed form in the second memory location;

second routines for processing said raw image data and for storing said processed image data; and a central processing unit coupled to the imaging device and to the memory buffer, for executing according to a predetermined set of priorities the first and second routines;

wherein the first routines are assigned priority over the second routines to thereby facilitate the rapid conveyance of raw image data away from the frame buffer.

17. The apparatus of claim 16, wherein the first routines are configured to convey the initially stored raw image data from the frame buffer to a RAM disk.

18. The apparatus of claim 17, wherein the second routines include:

a routine for transferring raw image data from the RAM disk to a flash memory;

a routine for compressing raw image data;

a routine for storing the compressed image data in the RAM disk; and a routine for transferring the compressed image data from the RAM disk to the flash memory;

wherein the routine for transferring raw image data from the RAM disk to a flash memory has priority over the routine for compressing raw image data, the routine for compressing raw image data has priority over the routine for storing the compressed image data in the RAM disk, and the routine for storing the compressed image data in the RAM disk has priority over the routine for transferring the compressed image data from the RAM disk to the flash memory.

* * * * *